Jan. 27, 1959     H. H. HILTON ET AL     2,871,426
ELECTROLYTIC CAPACITORS WITH INCREASED AVAILABLE CAPACITANCE
Filed Dec. 15, 1954
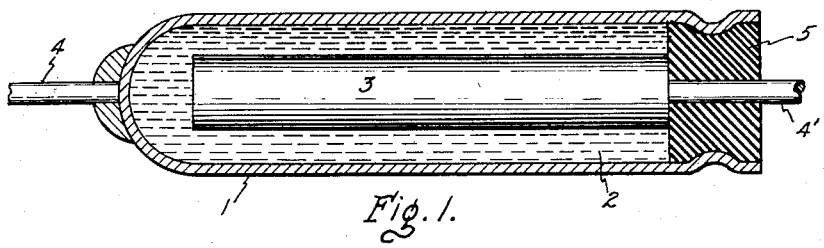
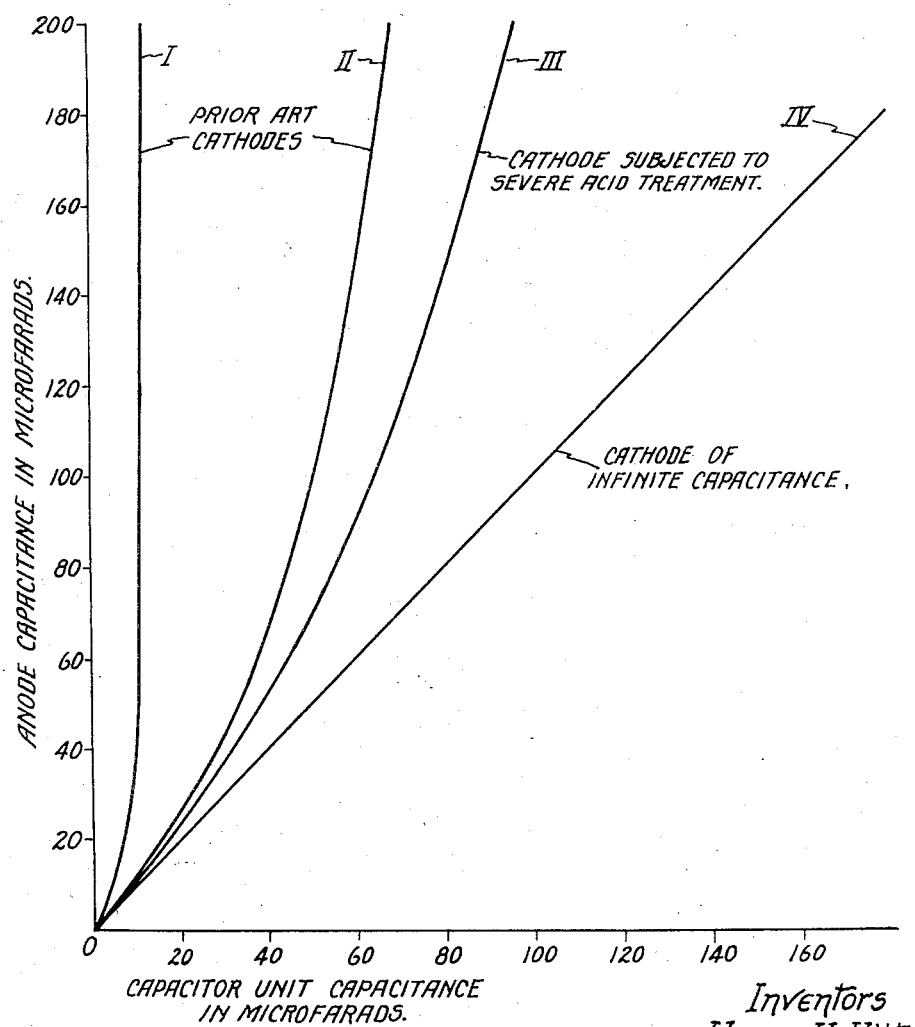
Inventors
Harry H. Hilton,
Alfred F. Torrisi,
by Gilbert P. Tarleton
Their Attorney.

United States Patent Office 2,871,426
Patented Jan. 27, 1959

2,871,426

ELECTROLYTIC CAPACITORS WITH INCREASED AVAILABLE CAPACITANCE

Harry H. Hilton, Glens Falls, N. Y., and Alfred F. Torrisi, Chicago, Ill., assignors to General Electric Company, a corporation of New York Application December 15, 1954, Serial No. 475,424

4 Claims. (Cl. 317—230)

The present invention relates to electrolytic devices, and more particularly to electrolytic capacitors.

Electrolytic capacitors conventionally include an electrolyte which is in contact with a pair of electrodes, one of which is the anode comprising usually a body of metal having a film formed thereon which serves as a dielectric for the capacitor, while the other electrode is the cathode. Metallic bodies used heretofore as electrodes in electrolytic capacitors have been of such type that resistive, dielectric or other films form on the surfaces thereof resulting in decreased capacitance of the capacitor unit as a whole.

It is an object of the present invention to provide an electrolytic capacitor having electrodes, especially a cathode, which avoid the above disadvantages of prior capacitor electrodes, and which affords increased capacitance in the capacitor unit.

It is a further object of the invention to provide a method of treating the electrodes and especially the cathode of electrolytic capacitors to increase the available capacitance produced in the capacitor unit.

A particularly notable advantage of electrolytic capacitors, as compared to the non-electrolytic type, resides in the great capacitance per unit of the electrode area which it exhibits, especially at very low voltages. However, it has been found that the available capacitance in an electrolytic capacitor is not fully utilized, as indicated above, due mainly to the characteristics of the cathode of the capacitor unit. The capacitance of the electrolytic capacitor can be considered, in effect, as the resultant of the capacitances of the anode and the cathode arranged in series. This is based on the fact that actually the electrolyte in an electrolytic capacitor is itself a cathode adjoining the dielectric film on the anode surface, while the usual metal electrode conventionally designated the cathode constitutes a second capacitor due to the dielectric film which usually forms on its surface adjoining the electrolyte. Consequently, the capacitance of an electrolytic capacitor is the reciprocal of the sum of the reciprocals of its anode and cathode capacitances which can be expressed by the well known equation:

$$C = \frac{C_a \times C_c}{C_a + C_c}$$

where $C_a$ is the capacitance of the anode, $C_c$ is the capacitance of the cathode, and $C$ is the capacitance of the unit. It will be apparent from the above equation that the capacitance of the cathode is an important factor in achieving the total capacitance of which the unit is capable, since in no case can the capacitance of a unit exceed that of its cathode.

It has been found, in accordance with the invention, particularly where silver is used as the cathode in an electrolytic capacitor, that unexpectedly and greatly improved results in increasing the available capacitance of the capacitor unit can be achieved by a novel treatment of the silver cathode, which may, for example, be in the form of a container or case enclosing the capacitor unit. The vastly improved results in increased capacitance were accomplished by treating the silver cases in a hot concentrated sulfuric acid bath for a prolonged period, and until the cases had a darkened, dull finish as compared to their bright glossy appearance prior to the severe acid treatment.

In capacitors of miniature and microminiature scale, the extremely small effective surface area presented by the electrodes makes it even more desirable to utilize the maximum available capacitance of the capacitor unit, and the present method of increasing the cathode capacitance is therefore especially valuable in these small types of capacitors.

The invention will be best understood when taken in conjunction with the following description and the accompanying drawings, in which:

Fig. 1 is a cross-sectional view of an electrolytic capacitor embodying the present invention; and Fig. 2 is a graph illustrating the improvement provided by the present invention as compared to the prior art devices.

As shown in Fig. 1, the electrolytic capacitor may comprise a substantially cylindrical container or case 1 made of silver which serves as the capacitor cathode. Cathode case 1 contains therein an electrolyte 2 of known composition which may be present either with or without an absorbent material (not shown) for retaining the electrolyte. The anode 3 arranged in the cathode case 1 is in contact with the electrolyte 2, the anode being formed of a metal not susceptible to corrosion by the electrolyte used in the capacitor, and being in the shape of a cylinder (as shown), a spiral, a coil, or other configuration. The anode 3 is provided with a dielectric film which may be formed by any well known method. Preferably, the anode is etched, in accordance with known processes, to produce a greater effective area in contact with the electrolyte and correspondingly increase the capacitance of the anode. The anode and cathode are provided with terminal leads 4, 4', in the usual manner, and the electrolyte 2 is sealed in case 1 by a suitable plug 5 of known construction.

The capacitor units for which the present silver cathodes are especially suited are those incorporating electrolytes which tend to be corrosive of the electrodes, unless the electrodes are made of a material inert or otherwise resistant to the action of the electrolyte. Examples of such electrolytes are those containing lithium chloride, and electrolytes composed of a mixture of ethylene glycol, distilled water and ammonium succinate or borate. Anode metals which resist corrosion of such electroylytes are therefore preferred for use in capacitors embodying the present invention, and among the types of materials which serve satisfactorily as anodes are film forming metals such as tantalum, niobium, alloys of tantalum and niobium, zirconium and titanium. Aluminum anodes (or cathodes) would not be suitable in such electrolytes since they are much less refractory than the above mentioned metals and would therefore be readily corroded by the electrolytes.

In accordance with the invention, the silver cathode casing 1 is subjected to a severe acid pre-treatment before assembly of the capacity unit in order to produce, at least on the inner face thereof, a dark and dull surface, and as a result of this treatment exceptionally marked increases in the total capacitance of the capacitor unit have been observed.

The acid used in the present process is concentrated sulfuric acid which may have a specific gravity as high as 1.84, and the temperature at which the acid treatment is carried out may vary between 50° C. and the boiling point of the sulfuric acid used. The boiling point of the acid thus may vary from about 290° C. in the case of sulfuric acid of 1.78 specific gravity, to about 330° C. for sulfuric acid of 1.84 specific gravity. The time of treatment of the silver electrode by the hot acid which is required to produce a dull, dark surface thereon may, therefore, vary depending on the concentration of the acid, the temperature of the acid, and, of course, on the condition of the electrode material as received.

In a typical process carried out in accordance with the invention, silver cases as received from the supplier were placed in a vessel and covered therein with cold concentrated sulfuric acid (about 93% $H_2SO_4$). A vacuum was applied to the vessel to exhaust the air trapped in the cases. The vessel was then placed over a source of heat and the temperature in the vessel was raised to about 130° C., which was maintained for approximately 15 minutes. At the end of this period, it was observed that the silver cases became dark and dull in appearance. The hot acid was then decanted, and the thus treated cases were rinsed several times in water until they were free of acid. Thereafter, the cases were oven-dried at about 85° C.

Fig. 2 of the drawing graphically shows the improved results provided by the present method of treating the capacitor cathode. In the graph, the unit capacitance in microfarads is plotted against the anode capacitance in microfarads. Since it is clear from the capacitance equation given above that the unit capacitance can never exceed that of the cathode, curve IV as drawn represents a cathode of infinite capacitance. It is evident from the graph that the closer the capacitance curve of a cathode approaches curve IV, the greater is the amount of available capacitance which can be produced in the capacitor unit.

Curves I and II represent the measured capacitance of two groups of prior art silver cathode cases which have not been acid treated or have been subjected only to a comparatively short period of acid treatment which leaves the cases with a bright surface. Curve III represents the capacitance of capacitor units with silver cathode cases of the same type as those of curve II which have, however, been subjected to a severe acid treatment in acordance with the invention. The area between curves I and II represents the possible variation in capacitance obtainable with silver cathode cases known to the art at the present time. The material represented by curve II is more the exception rather than the rule in terms of capacitance produced by prior art cathodes.

From the graph it will be seen that curve III, representative of a cathode treated in accordance with the present invention, is substantially closer than the prior art cathode to the ideal capacitance illustrated by curve IV and demonstrates the considerable increase in capacitance which is achieved by the present process of treating electrolytic capacitor cathodes.

In further tests, three groups of silver cases as received from the supplier were given comparative tests to determine the effectiveness of the present process in raising the capacitance values of cathodes, one-half of each group being given a severe sulfuric acid treatment as described above, while the other half in each group was left untreated. The following table shows the results observed:

Due to the characteristics of the Z angle meter by which the above capacitance measurements were taken, the actual capacitance of the samples is calculated from the equation $$C_A = C_e\sqrt{1+D^2}$$

where $C_A$ equals the actual capacitance, $C_e$ equals the equivalent capacitance (i. e., the capacitance as measured by the Z angle meter), and D equals the dissipation factor. Since the actual capacitance $C_A$ is the sum of the capacitances of the total surface including opposite sides of the samples, the actual inside capacitance of the individual cases is calculated as one half of the actual capacitance obtained.

The dissipation factor mentioned above is the ratio of the resistive component of the cathode current to the capacitive component of the cathode current. Thus, the increased dissipation factor characterizing the treated cathodes shows that the resistive component of the cathode impedance has been decreased by the acid cleaning. In other words, the acid treatment provides for improved conductivity between the electrolyte and the metal cathode in the capacitor.

The reasons for the unexpectedly great improvement in the capacitance obtained in the silver cathodes treated in accordance with the invention are not fully understood. In part, the increased capacitance is no doubt due to removal of foreign materials such as grease from the surface of the cathode and to etching of the metal, which affords increased effective contact between the cathode and the capacitor electrolyte. However, these effects alone do not appear to account for the excellent results obtained by the present process, in view of the fact that mechanical roughening or etching of the cathode surface has not been found to give the marked increase in cathode capacitance afforded by the present process. It is believed that the reaction of the hot concentrated sulfuric acid with the silver cathode, besides having the cleaning and negligible etching effects mentioned above, forms on the surface of the silver an exceptionally stable dielectric film of desirable properties. The film formed appears to be a relatively good conductor, which is particularly desirable in obtaining higher capacitance, since in the use of capacitors with direct current, the desired capacitor effect is achieved solely by means of the oxide or other dielectric film formed on the anode, and the current should pass without hindrance between the electrolyte and the cathode. The nature of the film on the cathode formed by reaction with the sulfuric acid is not definitely ascertainable due to its extreme thinness, but it may conceivably be a film of $Ag_2S$, $Ag_2O$ or $Ag_2SO_4$ or a combination of these compounds.

Another advantage of the present process resides in the improved maintenance of the attained capacitance of the silver cathode. While it has been believed heretofore that only a clean bright silver cathode surface would give the optimum capacitance of the unit, experience has shown that polar capacitors of this type having originally clean silver cathodes are subject to a downward drift in capacitance with the passage of time. This decrease in capacitance has also been found to characterize capacitors incorporating the usual film-forming cathodes such as aluminum on which oxide films are formed. Such films are typical of the dielectric or resistive films to

|  | Group A | | Group B | | Group C | |
| --- | --- | --- | --- | --- | --- | --- |
|  | Not Treated | Treated | Not Treated | Treated | Not Treated | Treated |
| Capacitance $C_e$ (mfd.), average of 10 samples | 82.3 | 1,081.0 | 59.6 | 845.1 | 69.3 | 476.8 |
| Dissipation Factor, average of 10 samples | .07 | 1.84 | .75 | 1.55 | .67 | .79 |
| Average Actual Capacitance $C_A$ (mfd.) | 99 | 2,265 | 74.5 | 1,560 | 83.5 | 607 |
| Average Actual Inside Capacitance (mfd.) | 49.5 | 1,132 | 37.2 | 785 | 41.7 | 303.5 | which low cathode capacitance is attributable, and, moreover, these types of films are relatively unstable in that with the passage of time they cause a further decrease in the cathode capacitance.

The present process has been found to overcome the above disadvantages to a considerable degree, due presumably to the thin film which apparently constitutes, at least in part, the dull, dark surface of the treated silver cathode. Not only does this film initially contribute to a marked increase in the capacitance of the cathode, but due to its stability serves to maintain indefinitely the capacitance thus attained.

While certain embodiments of the present invention have been described, it is to be understood that various modifications may be made without going beyond the scope of the invention. For example, the silver cathodes may be in forms other than that of containers; for example, they could be flat or wound electrodes or any other shape. Silver electrodes herein disclosed may also be used as anodes at sufficiently low voltages, below about 0.1 volt. Further, the cathode containers may be of other metals than silver but having silver deposited on the inner surfaces thereof in contact with the electrolyte. Also, electrolytes other than those mentioned could be incorporated in capacitors in which the present cathodes are used, and may be of liquid, semi-solid or other form. Therefore, the appended claims are intended to cover all such equivalent variations as come within the true spirit and scope of the foregoing invention.

What we claim as new and desire to secure by Letters Patent of the United States is:

1. An electrolytic capacitor comprising, in combination, an electrolyte and a pair of spaced electrodes co-acting with said electrolyte, at least one of said electrodes being formed of silver and being subjected to a pre-treatment with concentrated sulfuric acid at a temperature of between 50° C. and the boiling point of the acid for a sufficient period to produce a dark, dull surface thereon, whereby the capacitance of said silver electrode and thereby the available capacitance of the capacitor are increased.

2. An electrolytic capacitor comprising, in combination, a silver cathode casing, an electrolyte contained in said casing, and an anode arranged in said casing and having a dielectric film formed thereon contiguous to said electrolyte, said silver cathode casing being subjected to a pre-treatment with concentrated sulfuric acid at a temperature of between 50° C. and the boiling point of the acid for a sufficient period to produce a dark, dull surface thereon, whereby the capacitance of the cathode and thereby the available capacitance of the capacitor are increased.

3. An electrolytic capacitor comprising, in combination, an electrolyte, an anode formed of a metal selected from the group consisting of tantalum, niobium, zirconium, titanium and alloys or combinations thereof, said anode having a dielectric film formed on the surface thereof, and a silver cathode having contiguous to said electrolyte a dull, dark surface produced by treatment of said silver cathode with hot concentrated sulfuric acid, whereby the capacitance of the cathode and thereby the available capacitance of the capacitor are increased.

4. A low voltage capacitor comprising, in combination, an electrolyte and a pair of spaced electrodes comprising an anode and a cathode co-acting with said electrolyte, at least said anode being formed of silver and being subjected to a pre-treatment with concentrated sulfuric acid at a temperature of between 50° C. and the boiling point of the acid for a sufficient period to produce a dark, dull surface thereon, whereby the capacitance of said silver anode and thereby the available capacitance of the capacitor are increased.

References Cited in the file of this patent

UNITED STATES PATENTS

| 2,616,953 | Booe | Nov. 4, 1952 |
| 2,617,863 | Stinson | Nov. 11, 1952 |
| 2,710,369 | Booe | June 7, 1955 |

OTHER REFERENCES

Electrical Manufacturing, volume 46, Issue 6, pages 82 to 85, published December 1950.

Mellor: Treatise on Inorganic Theoretical Chemistry, volume 3, page 350, published by Longmans Green & Co., New York City, © 1923.